United States Patent
Hayashi et al.

(10) Patent No.: US 11,534,912 B2
(45) Date of Patent: Dec. 27, 2022

(54) VIBRATION DISPLAY DEVICE, OPERATION PROGRAM CREATING DEVICE, AND SYSTEM

(71) Applicant: FANUC CORPORATION, Yamanashi (JP)

(72) Inventors: Kouichirou Hayashi, Yamanashi (JP); Hajime Suzuki, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 243 days.

(21) Appl. No.: 16/834,062

(22) Filed: Mar. 30, 2020

(65) Prior Publication Data
US 2020/0338724 A1    Oct. 29, 2020

(30) Foreign Application Priority Data
Apr. 26, 2019    (JP) .............................. JP2019-085598

(51) Int. Cl.
*B25J 9/16*    (2006.01)
(52) U.S. Cl.
CPC ..... *B25J 9/163* (2013.01); *G05B 2219/39295* (2013.01); *G05B 2219/39298* (2013.01); *G05B 2219/43203* (2013.01)
(58) Field of Classification Search
CPC ... B25J 9/16; B25J 9/163; B25J 9/1671; B25J 13/088; B25J 9/1664; B25J 9/1674; B25J 19/0095; G05B 2219/39295; G05B 2219/39298; G05B 2219/43203; G05B 2219/39195
See application file for complete search history.

(56) References Cited

U.S. PATENT DOCUMENTS

| 2001/0033146 A1* | 10/2001 | Kato .................... G05B 5/01 318/568.22 |
| 2007/0001638 A1* | 1/2007 | Gray .................... B25J 9/1692 318/568.11 |
| 2011/0208356 A1* | 8/2011 | Kato .................... B25J 9/163 700/253 |
| 2011/0246132 A1 | 10/2011 | Sato et al. |
| 2014/0236565 A1 | 8/2014 | Kuwahara |

(Continued)

FOREIGN PATENT DOCUMENTS

| EP | 2769810 A2 | 8/2014 |
| EP | 2783812 A2 | 10/2014 |

(Continued)

OTHER PUBLICATIONS

Japanese Notice of Reasons for Refusal dated Aug. 17, 2021, for Japanese Patent Application No. 2019085598.

(Continued)

*Primary Examiner* — Kira Nguyen
(74) *Attorney, Agent, or Firm* — Karceski IP Law, PLLC

(57) ABSTRACT

A vibration display device including a vibration acquisition unit that acquires a vibration state of a distal end section of a robot that is a robot in a simulation or in a real world, the distal end section being moved based on an operation program, and a vibration trajectory drawing unit that draws, on a display device, the vibration state along a trajectory of the distal end section of the robot or that draws, on the display device, the vibration state as the trajectory.

12 Claims, 11 Drawing Sheets

(56) References Cited

U.S. PATENT DOCUMENTS

| | | | |
|---|---|---|---|
| 2014/0277737 A1 | 9/2014 | Sekiyama et al. | |
| 2014/0288525 A1* | 9/2014 | Fudaba | A61B 5/066 604/500 |
| 2015/0039128 A1* | 2/2015 | Oaki | B25J 9/1641 700/253 |
| 2015/0336269 A1 | 11/2015 | Linnell et al. | |
| 2016/0096271 A1* | 4/2016 | Taylor | B25J 9/1628 700/258 |
| 2018/0281186 A1* | 10/2018 | Hiraide | B25J 9/1641 |
| 2020/0005519 A1 | 1/2020 | Ozdas et al. | |

FOREIGN PATENT DOCUMENTS

| | | |
|---|---|---|
| EP | 3610996 A1 | 2/2020 |
| JP | H01205206 A | 8/1989 |
| JP | 2010207997 A | 9/2010 |
| JP | 2011167817 A | 9/2011 |
| JP | 2014065107 A | 4/2014 |
| JP | 2014161921 A | 9/2014 |
| JP | 2014180707 A | 9/2014 |
| JP | 2017124455 A | 7/2017 |
| JP | 6385627 B1 | 9/2018 |
| JP | 2018176342 A | 11/2018 |
| JP | 2019034352 A | 3/2019 |
| WO | 2010067651 A1 | 6/2010 |
| WO | 2015179099 A1 | 11/2015 |
| WO | 2017175340 A1 | 10/2017 |
| WO | 2019046559 A1 | 3/2019 |
| WO | 2019092792 A1 | 5/2019 |

OTHER PUBLICATIONS

Japanese Search Report by Registered Search Organization dated Jul. 29, 2021, for Japanese Patent Application No. 2019085598.

* cited by examiner

VIBRATION DISPLAY DEVICE, OPERATION PROGRAM CREATING DEVICE, AND SYSTEM

CROSS-REFERENCE TO RELATED APPLICATIONS

This application is based on and claims priority to Japanese Patent Application No. 2019-085598, filed on Apr. 26, 2019, the entire content of which is incorporated herein by reference.

FIELD OF THE INVENTION

The present invention relates to a vibration display device, an operation program creating device, and a system.

BACKGROUND OF THE INVENTION

There is a known technique for displaying, on a display device, a trajectory of a distal end of a robot when the robot is moved, together with an image of the robot. Such a technique is disclosed, for example, in Japanese Unexamined Patent Application, Publication No. 6385627.

Furthermore, there is a known robot control technique in which a vibration of a robot while being operated is measured by using an acceleration sensor and in which learning is performed so as to bring the measured value close to a target value. Such a technique is disclosed, for example, in Japanese Unexamined Patent Application, Publication No. 2011-167817.

SUMMARY OF THE INVENTION

According to a first aspect, the present disclosure provides a vibration display device including: a vibration acquisition unit that acquires a vibration state of a distal end section of a robot that is a robot in a simulation or in a real world, the distal end section being operated based on an operation program; and a vibration trajectory drawing unit that draws, on a display device, the vibration state along a trajectory of the distal end section of the robot or that draws, on the display device, the vibration state as the trajectory.

According to a second aspect, the present disclosure provides an operation program creating device including: the vibration display device; and a learning unit that performs learning about vibration of the distal end section, in a selected region selected in the trajectory of the distal end section, wherein the trajectory is drawn on the vibration display device when selecting the selected region, and the learning unit creates an improved operation program for reducing the vibration of the distal end section in the selected region.

According to a third aspect, the present disclosure provides a system including: a robot; an operation program creating device that creates an operation program for controlling the robot; and a host control system capable of communicating with the operation program creating device, wherein the operation program creating device includes: a display device that displays a trajectory of a distal end section of the robot, the distal end section being moved in accordance with the operation program; a learning unit that performs learning about vibration of the distal end section in a selected region selected in the trajectory of the distal end section, which is displayed on the display device, and that reduces vibration of the distal end section in the selected region; and the host control system accumulates learning results received from the operation program creating device.

DESCRIPTION OF EMBODIMENT(S) OF THE INVENTION

Figure 1:
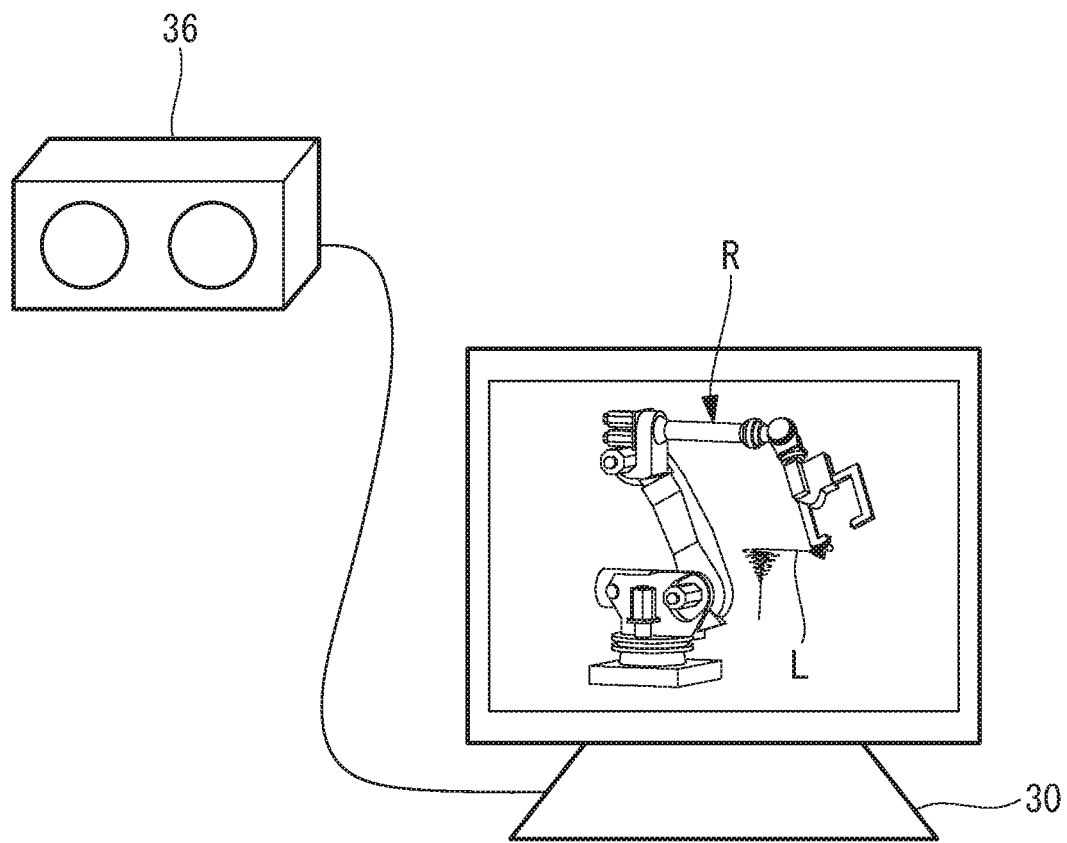
FIG. 1 is a view showing, in outline, the configuration of an operation program creating device according to a first embodiment of the present invention.
Figure 2:
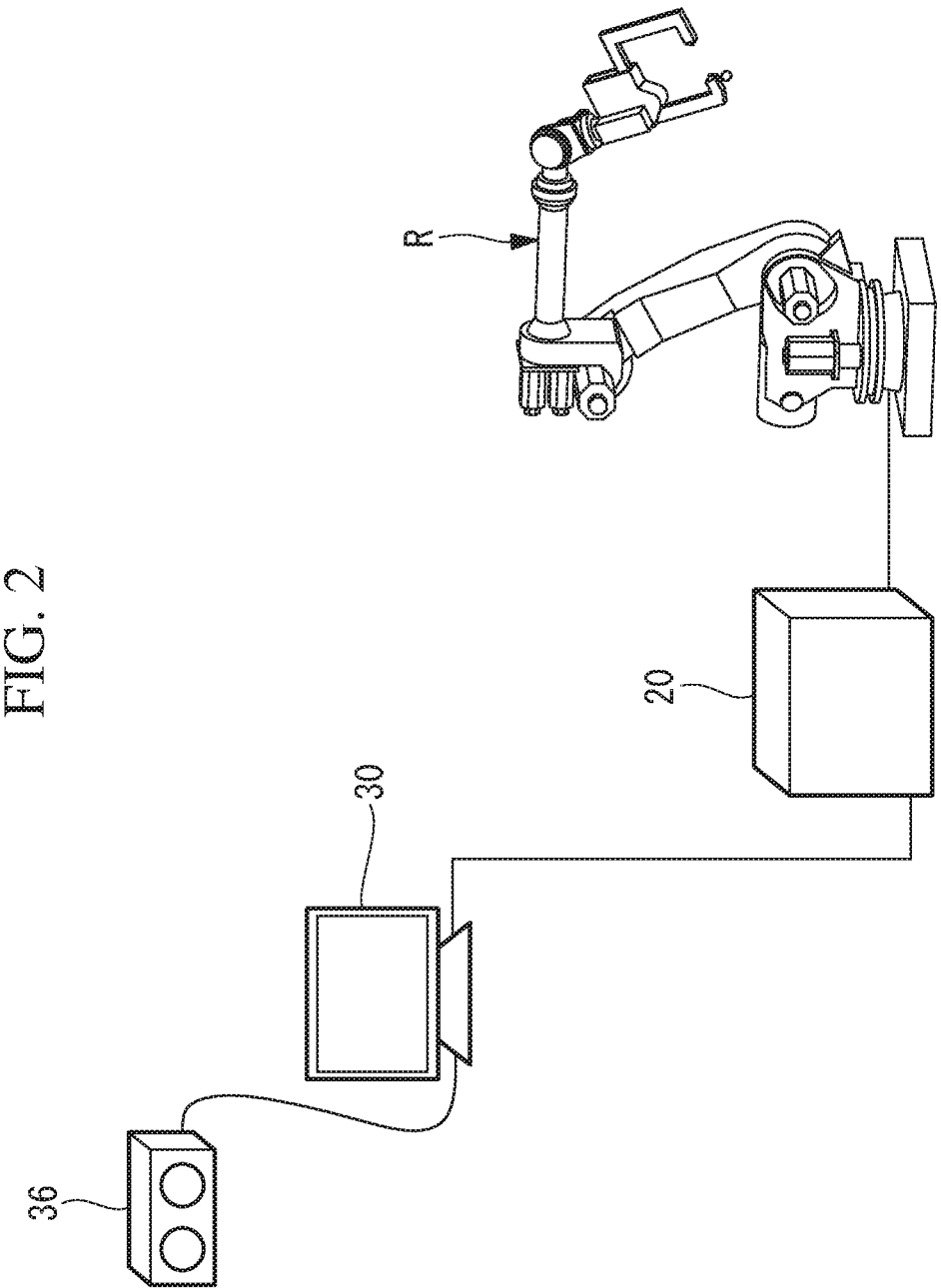
FIG. 2 is a view showing, in outline, the configuration of an operation program creating device according to a second embodiment.
Figure 3:
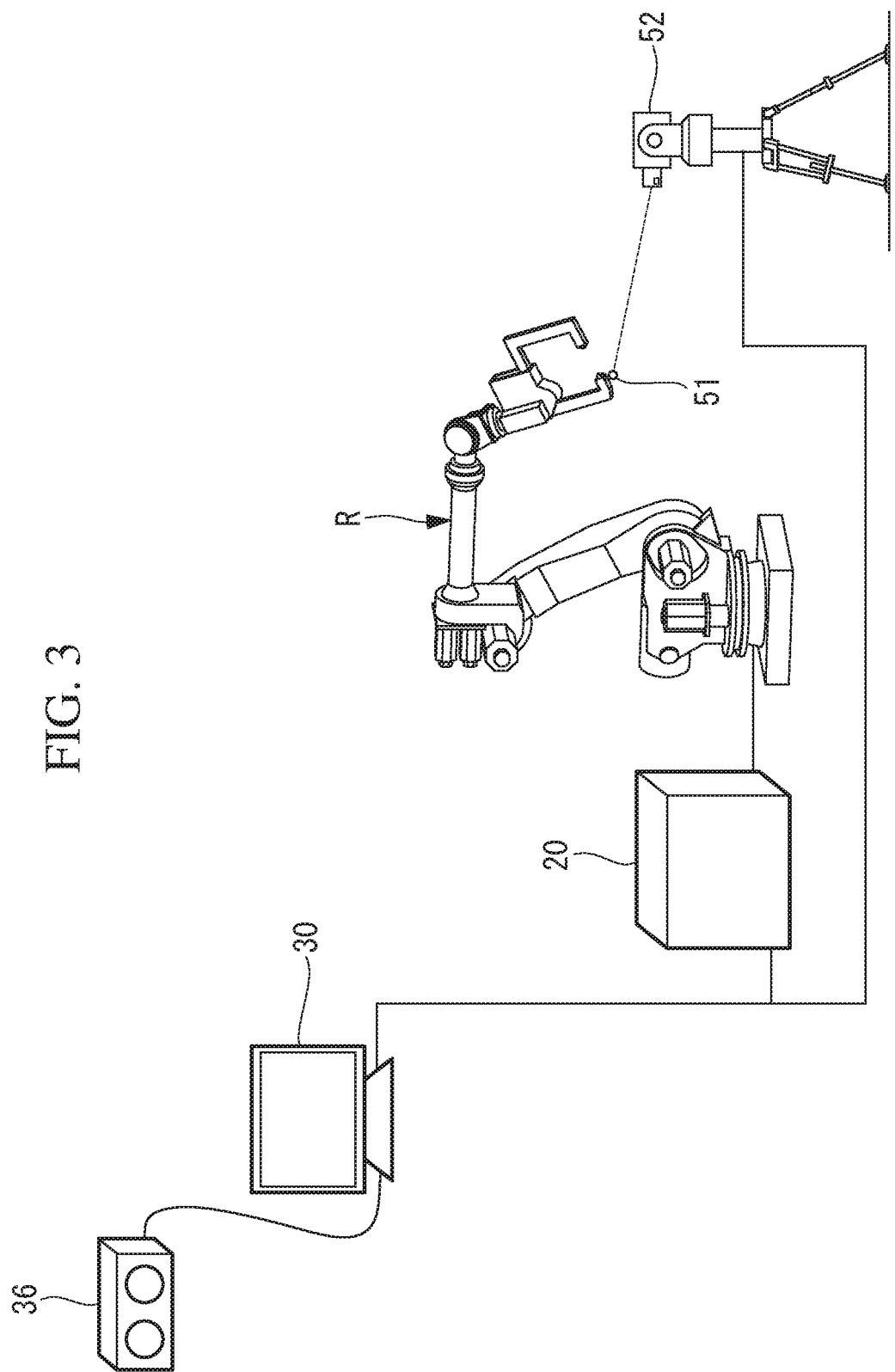
FIG. 3 is a view showing, in outline, the configuration of an operation program creating device according to a third embodiment.

As shown in FIGS. 1 to 3, an operation program creating device according to each embodiment may be a computer 30 that performs a simulation or may be a robot controller 20 that controls a robot R. Although the following description will be given of a case in which the operation program creating device is the computer 30, the configurations described later can also be applied to the robot controller 20.

A vibration display device and an operation program creating device according to a first embodiment will be described below with reference to the drawings.

In the first embodiment, as shown in FIG. 1, a display device (vibration display device) 36 that is a head-mounted display is connected to the computer 30, which is the operation program creating device, and a vibration state of the robot R is displayed on the display device 36.

Figure 5:
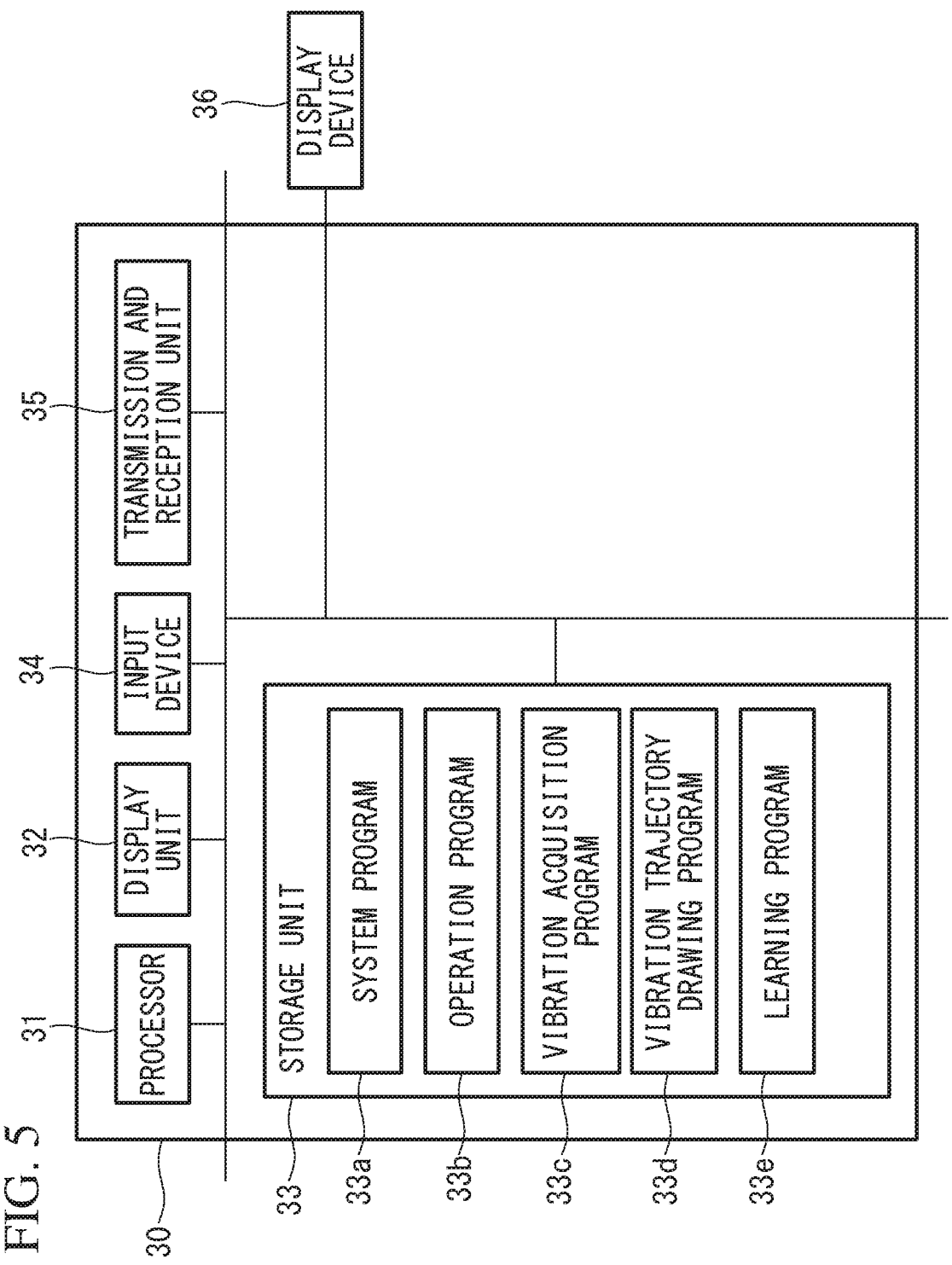
FIG. 5 is a block diagram of a computer in the respective embodiments.

As shown in FIG. 5, the computer 30 includes: a processor 31, such as a CPU; a display unit 32, such as a liquid crystal display device; a storage unit 33 that has a non-volatile storage, a ROM, a RAM, etc.; an input device 34 that is a keyboard, a touch screen, or the like; and a transmission and reception unit 35 that performs transmission and reception of signals, data, etc. When the display unit 32 has a touch screen function, the display unit 32 also functions as the input device 34. Furthermore, in this embodiment, the display unit 32 also functions as a vibration display device.

The storage unit 33 stores a system program 33a, and the system program 33a serves basic functions of the computer 30. The storage unit 33 stores an operation program 33b for the robot R. The operation program 33b is created on the basis of a reference coordinate system of the robot R and is used to sequentially dispose a distal end section of the robot R at a plurality of predetermined positions and in a plurality of predetermined orientations in the reference coordinate system. The robot controller 20 operates the robot R on the basis of the operation program 33b.

The storage unit 33 stores: a vibration acquisition program (vibration acquisition means) 33c for acquiring a vibration state of the distal end section of the robot R; and a vibration trajectory drawing program (vibration trajectory drawing means) 33d for drawing the vibration state of the distal end section of the robot R, which is acquired by means of the vibration acquisition program 33c, along the distal end section of the robot R. Furthermore, the storage unit 33 also stores a learning program (learning means) 33e.

Figure 4:
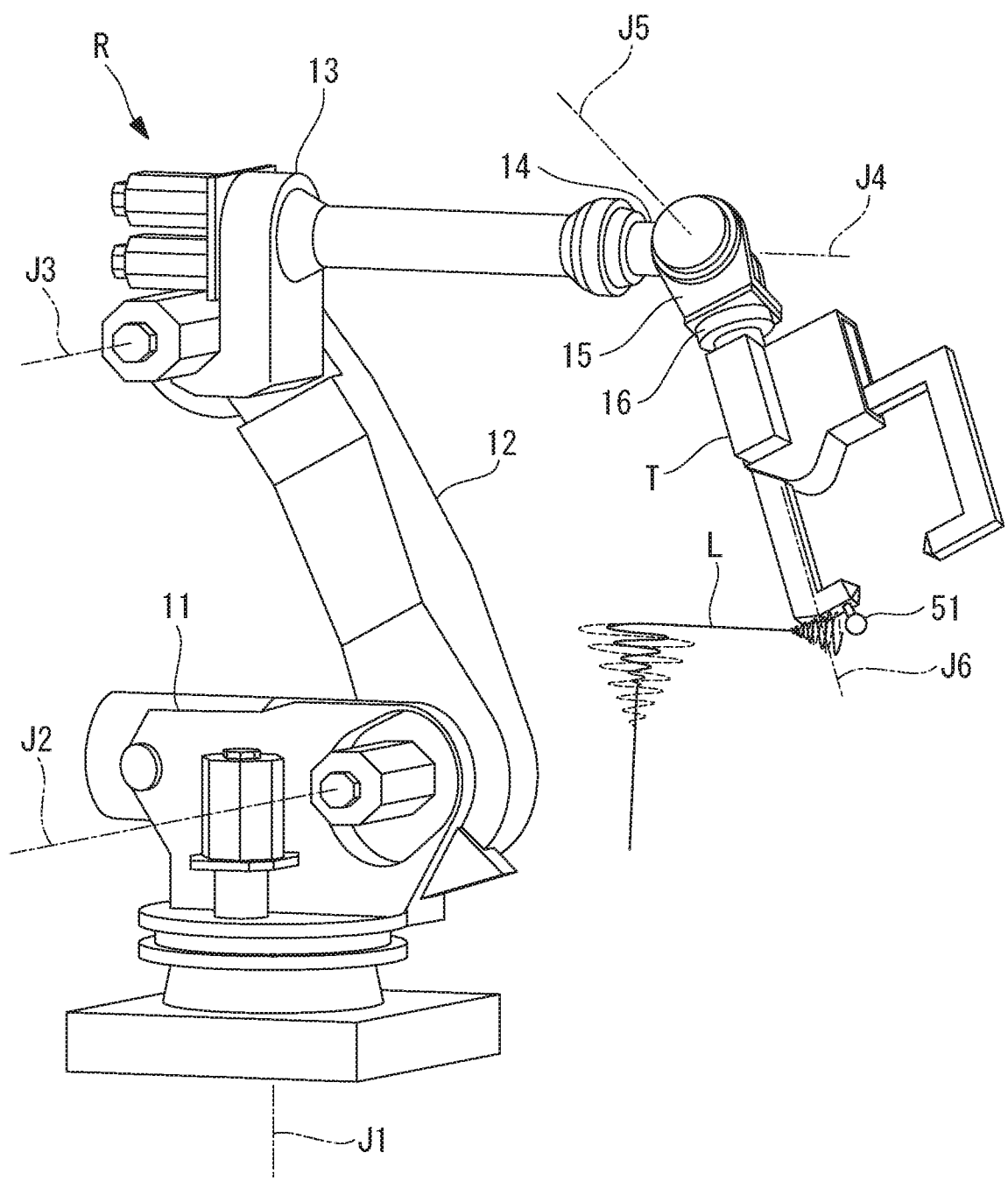
FIG. 4 is a perspective view of a robot in the respective embodiments.

Although the robot R is a vertical articulated type robot in the example shown in FIG. 4, the robot R may be a horizontal articulated type robot, a multi-link type robot, or another type of robot.

The robot R shown in FIG. 4 has a plurality of servomotors (drive motors) 11a, 12a, 13a, 14a, 15a, and 16a (FIG. 6) that drive arm members 11, 12, 13, 14, 15, and 16 about a plurality of movable axes J1, J2, J3, J4, J5, and J6, respectively. Driving forces of the servomotors 11a, 12a, 13a, 14a, 15a, and 16a are transmitted to the arm members 11, 12, 13, 14, 15, and 16 via reducers. Furthermore, the servomotors 11a, 12a, 13a, 14a, 15a, and 16a each have a operating position detecting device 17 for detecting the operating position thereof, and the operating position detecting device 17 is, in one example, an encoder. Detection results from the operating position detecting devices 17 are sent to the robot controller 20.

The robot R has, at a distal end section thereof, a tool T for processing, e.g., welding. In this embodiment, although the tool T is treated as the distal end section of the robot R, the arm member 16, on which the tool T is mounted, may also be treated as the distal end section of the robot R. The tool T may be an inspection tool, a cleaning tool, a workpiece handling tool, an assembly tool, or another tool.

Figure 6:
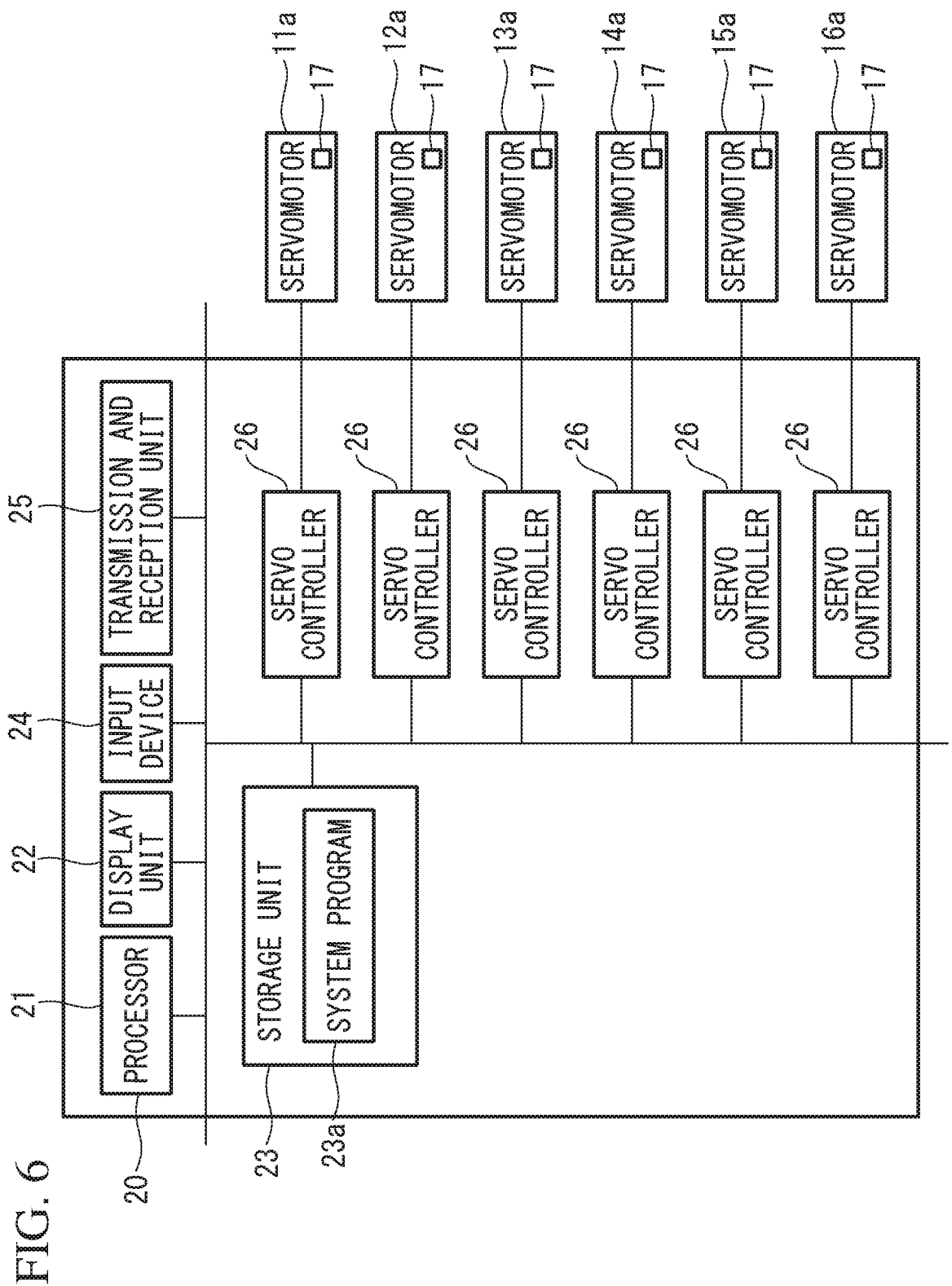
FIG. 6 is a block diagram of a robot controller in the respective embodiments.

As shown in FIG. 6, the robot controller 20 includes: a processor 21 that is a CPU, etc.; a display unit 22, such as a liquid crystal display device; a storage unit 23 that has a non-volatile storage, a ROM, a RAM, etc.; an input device 24 that is a keyboard, an operation panel, a touch screen, or the like; a transmission and reception unit 25 that performs transmission and reception of signals, data, etc.; and servo controllers 26 that respectively correspond to the servomotors 11a to 16a. The storage unit 23 stores a system program 23a, and the system program 23a basically functions as the robot controller 20.

On the other hand, the storage unit 33 of the computer 30 stores a model of the robot R, and the computer 30 can display the model of the robot R on the display device 36 or the display unit 32. The storage unit 33 of the computer 30 also stores a model of an installation surface on which the robot R is installed, a conveyor placed on the installation surface, a model of a workpiece on which processing, such as welding, is performed by using the robot R, a model of a jig that supports the workpiece, and a model of another machine or the like, and the computer 30 can display these models on the display device 36 or the display unit 32.

In one example, the computer 30 creates the operation program 33b, which causes the robot R to perform spot welding on a plurality of positions of the workpiece, on the basis of an input to the input device 34 performed by a user.

The computer 30 moves the robot R in the simulation in accordance with the operation program 33b and displays the operation of the robot R on the display device 36 or the display unit 32.

The model of the robot R in the simulation has information regarding the weight and rigidity of each of the arm members 11, 12, 13, 14, 15, and 16, the weight and rigidity of each of the servomotors 11a, 12a, 13a, 14a, 15a, and 16a, and the weight and rigidity of each of the reducers. In short, the model of the robot R has information regarding the weight and rigidity of the actual robot R. Furthermore, the model of the robot R also has information regarding the performance of each of the servomotors 11a, 12a, 13a, 14a, 15a, and 16a. Thus, the simulated robot R performs an operation that is similar or identical to the actual robot R. Furthermore, the simulated robot R is disposed at the same position as the real robot R with respect to the reference coordinate system. Thus, an operation of the simulated robot R based on the operation program 33b is the same as an operation of the real robot R based on the operation program 33b.

When the robot R is moved in the simulation, the computer 30 acquires a trajectory and a vibration state of the distal end section of the robot R. The vibration state to be acquired is, in one example, vibration data indicating vibration of the distal end section. The vibration data can be data of the acceleration of the distal end section, which changes over time, or data of the amplitude of the distal end section, which changes over time. It is conceivable that the trajectory is divided into a plurality of areas. In this case, the vibration state to be acquired can be the maximum value of the acceleration of the distal end section of the robot R in each of the areas of the trajectory or the maximum value of the amplitude of the distal end section of the robot in each of the areas of the trajectory. The data of the acceleration has data regarding the direction and frequency related to the acceleration, and the data of the amplitude has data regarding the direction and frequency related to the amplitude.

The vibration state to be acquired is, in another example, data of the trajectory of the distal end section of the robot R itself. When the distal end section of the robot R vibrates, the trajectory cyclically vibrates.

When the computer 30 displays a trajectory L of the distal end section of the robot R on the display unit 32 and the display device 36, the vibration state of the distal end section of the robot R is displayed on the display unit 32 and the display device 36 on the basis of the vibration trajectory drawing program 33d. In one example, the computer 30 displays the trajectory L, which cyclically vibrates as described above. Because the amplitude of the vibration of the distal end section of the robot R is extremely small, in many cases, the computer 30 displays the amplitude of the vibration at, for example, a magnified manner of several times to several tens of times larger (FIGS. 1 and 4). Note that, when the robot controller 20 functions as the vibration display device, similar display as on the display unit 32 is performed on the display unit 22 or a display unit provided on the input device 24.

Figure 7:
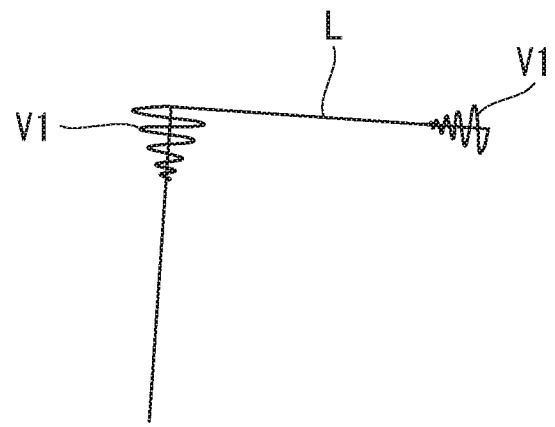
FIG. 7 is a display example displayed on a display device in the respective embodiments.
Figure 8:
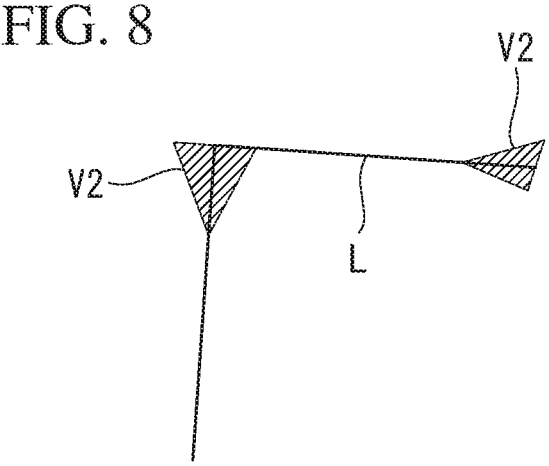
FIG. 8 is a display example displayed on the display device in the respective embodiments.

In another example, the computer 30 creates images V1 that indicate vibrations of the distal end section of the robot R, on the basis of the data of the acceleration, the data of the amplitude, etc., and displays the images V1 on the display device 36 or the display unit 32, together with the trajectory L of the distal end section of the robot R (FIG. 7). Instead of the images V1, it is also possible to use images V2 that are formed of lines whose color, the thickness, etc., vary in accordance with the magnitude of vibration, as shown in FIG. 8.

In still another example, the computer 30 displays a detailed trajectory L of the distal end section of the robot R on the display device 36 or the display unit 32, as is. The detailed trajectory L includes vibration of the distal end of the robot R. The user may operate an operation part of the input device 34 or the display device 36, to enlarge and display the position of interest on the display device 36 or the like.

Note that, when the display device 36 is a head-mounted display, the display device 36 includes a 9-axis sensor, and the point of view in the model in the simulation changes in accordance with a detection result from the 9-axis sensor. Specifically, an image to be displayed on the display device 36 changes in accordance with a detection result from the 9-axis sensor.

For example, the 9-axis sensor includes: acceleration sensors for acceleration in the X-axis direction, the Y-axis direction, and the Z-axis direction; acceleration sensors for acceleration around the X-axis, the Y-axis, and the Z-axis; and a 3-axis compass sensor. Thus, the computer 30 recognizes a change in the position and a change in the orientation of the display device 36 on the basis of a detection results from the 9-axis sensor. The computer 30 changes the point of view in the model in the simulation, on the basis of the change in the position and the change in the orientation of the display device 36, which are recognized on the basis of the detection results from the 9-axis sensor. Accordingly, by changing the position and orientation of the head, the user can observe the point of interest in an enlarged manner and can observe the point of interest from another angle.

Changes in the position and orientation of the head made by the user are consistent with changes in the position and orientation of the display device 36. Then, when the display device 36 is moved in such a direction as to approach the distal end section of the robot R, an arbitrary region in a displayed image of the display device 36 is displayed in an enlarged manner. Specifically, it can be said that the above-mentioned changes in the position and orientation of the head made by the user are operations for displaying the arbitrary region in the displayed image of the display device 36 in an enlarged manner.

Note that an arbitrary region in the displayed image of the display unit 32 may be displayed in an enlarged manner when the user operates an arbitrary position of the display unit 32, which has a touch screen function, by using a finger.

In a state in which the distal end section of the robot R and the workpiece come close to each other, slight vibration of the distal end section of the robot R is problematic, in many cases. However, because it is dangerous for the user to approach the distal end section of the robot R in this state, the user cannot visually observe the situation calmly. The above-described enlarged display allows enlarged observation of vibration of the distal end section of the robot R, thus being extremely useful for the user to create and improve the operation program 33b.

Furthermore, the computer 30 performs learning for reducing the vibration of the robot R, on the basis of the learning program (learning means) 33e, which is stored in the storage unit 33. For example, when the user inputs a target value for the vibration of the distal end section of the robot R and instructs start of the learning, by using the input device 34, the computer 30 moves the robot R in the simulation a plurality of times on the basis of the operation program 33b.

At this time, the computer 30 searches for an optimal operation of the robot R while changing the operating speed, e.g., the operating speed of each of the servomotors 11a, 12a, 13a, 14a, 15a, and 16a, little by little. Then, an improved operation program that is improved on the basis of the learning program 33e is stored in the storage unit 33. Note that it is possible to use a well-known learning program and to achieve a reduction in the vibration of the distal end section of the robot R through various well-known learning techniques.

The computer 30 acquires an improved vibration state of the robot R operated on the basis of the improved operation program. The vibration state to be acquired is the same as or similar to the vibration state acquired on the basis of the operation program 33b that has not been improved.

When displaying the trajectory L of the distal end section of the robot R on the display unit 32 and the display device 36, the computer 30 displays the vibration state before the improvement and the vibration state after the improvement, on the display unit 32 and the display device 36, on the basis of the vibration trajectory drawing program 33d. It is preferred that the vibration state before the improvement and the vibration state after the improvement be displayed so as to be distinguishable from each other. In one example, as shown in FIG. 4, the color or the display manner of the trajectory L that indicates the vibration state after the improvement is made different from the color or the display manner of the trajectory L that indicates the vibration state before the improvement. In FIG. 4, the vibration state before the improvement is shown with a dashed line. The vibration state after the improvement is also displayed in any of the above-described display manners for the vibration state before the improvement.

The user compares the vibration state after the improvement with the vibration state before the improvement, thereby making it possible to easily and appropriately determine the necessity for further improvement of the operation program 33b. Even if the vibration of the distal end section of the robot R is small, when the small vibration is displayed on the display unit 32 or the display device 36 as in the above-described manner, the user can easily and reliably find vibration that is problematic.

Although even slight vibration exerts a big influence on the processing accuracy of a workpiece, for example, when the distal end section of the robot R has reached a processing point or during processing, small vibration may not be problematic while the distal end section of the robot R is just moving. Such a determination differs depending on the type of workpiece, the type of processing to be applied to the workpiece, requirements for the processing accuracy, etc. Thus, the fact that the user can easily and reliably grasp the state of vibration, as described above, is extremely advantageous for improving both the work efficiency of the robot R and the work accuracy of the robot R.

Figure 9:
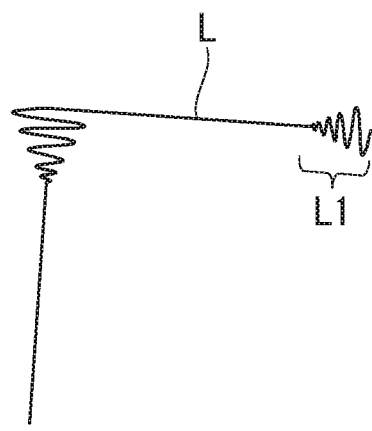
FIG. 9 is a display example displayed on the display device in the respective embodiments.

As shown in FIG. 9, the user can select a range L1 that is part of the trajectory L of the distal end section of the robot R, which is displayed on the display unit 32 or the display device 36, by operating the display unit 32, which has a touch screen function. It is also possible for the user to perform the selection by using the input device 34. For example, in a state in which a selected range L1 of the trajectory L has been selected, the user can instruct the computer 30 to start learning by using the touch screen function of the display unit 32, the input device 34, or the like.

In this case, the computer 30 focuses on learning about the vibration of the distal end section of the robot R in the selected range L1. In one example, the computer 30 learns only about the vibration of the distal end section of the robot R in the selected range L1. For example, the computer 30 moves, in the simulation, the robot R within a limited range including the selected range L1, a plurality of times, thereby reducing the vibration in the selected range L1. A vibration state obtained on the basis of an improved operation program that is improved through this learning is displayed on the display unit 32 or the display device 36, as described above.

Note that it is also possible for the user to improve the operation program 33b by using the input device 34 or the like, without using the learning program 33e. In this case, a vibration state obtained on the basis of the improved operation program is also displayed on the display unit 32 or the display device 36.

Furthermore, it is also possible that a vibration state obtained on the basis of the improved operation program is displayed on the display unit 32 or the display device 36, together with a taught trajectory (target trajectory), instead of a vibration state obtained on the basis of the operation program 33b before the improvement.

A vibration display device and an operation program creating device according to a second embodiment will be described below with reference to the drawings.

The configuration of the vibration display device of the second embodiment is the same as that of the first embodiment. As shown in FIG. 2, the operation program creating device of the second embodiment differs from that of the first embodiment in that the operation program creating device of the second embodiment is connected to the robot controller 20 of the robot R, and the computer 30 acquires a vibration state of the distal end section of the robot R from the robot controller 20.

The robot R, the robot controller 20, and the computer 30 in the second embodiment have configurations which are the same as or similar to those in the first embodiment, unless otherwise specified below.

In the second embodiment, the actual robot R is operated on the basis of the operation program 33b. Furthermore, the robot controller 20 acquires, through calculation, a trajectory and a vibration state of the distal end section of the robot R on the basis of detection results (operation information) from the operating position detecting devices 17 of the servomotors 11a, 12a, 13a, 14a, 15a, and 16a obtained when the above operation is performed. The vibration state to be acquired is the same as or similar to the vibration state acquired in the simulation in the first embodiment.

The robot controller 20 may also acquire, through calculation, the trajectory and the vibration state of the distal end section of the robot R on the basis of drive current values (operation information) of the servomotors 11a, 12a, 13a, 14a, 15a, and 16a obtained when the above operation is performed. In this case, the vibration state to be acquired is the same as or similar to the vibration state acquired in the simulation in the first embodiment.

The computer 30 acquires the trajectory L and the vibration state, which are acquired as described above, from the robot controller 20 and displays the trajectory and the vibration state on the display device 36 or the display unit 32, as in the first embodiment.

In the second embodiment, vibration of the distal end section of the robot R is acquired, through calculation, on the basis of the detection results at the respective joints of the actual robot R. Thus, the user can know the vibration of the actual robot R. Furthermore, the user can appropriately perform the above-described learning etc. for reducing the vibration of the actual robot R. Furthermore, in the second embodiment, it is possible to acquire vibration of the distal end section of the actual robot R, without adding a sensor.

A vibration display device and an operation program creating device according to a third embodiment will be described below with reference to the drawings.

The configuration of the vibration display device of the third embodiment is the same as that of the first embodiment. The operation program creating device of the third embodiment differs from that of the first embodiment in that the operation program creating device of the third embodiment has a vibration measurement sensor 52, as shown in FIG. 3, and the computer 30 acquires a vibration state of the distal end section of the robot R from the vibration measurement sensor 52.

The robot R, the robot controller 20, and the computer 30 in the third embodiment have configurations which are the same as or similar to those in the first embodiment, unless otherwise specified below.

In the third embodiment, the actual robot R is operated on the basis of the operation program 33b. As shown in FIG. 3, for example, a known reflector 51 is mounted at the distal end section of the robot R, and the vibration measurement sensor 52, which is a laser tracker for detecting the position of the reflector 51, is provided in the vicinity of the robot R. Instead of the laser tracker, an acceleration sensor serving as the vibration measurement sensor may also be mounted at the distal end section of the robot R.

The vibration measurement sensor 52 is connected to the robot controller 20, for example, and the robot controller 20 recognizes the trajectory of the distal end section of the robot R on the basis of detection results from the operating position detecting devices 17 of the servomotors 11a, 12a, 13a, 14a, 15a, and 16a. Furthermore, the robot controller 20 acquires a vibration state of each position of the trajectory on the basis of detection results from the vibration measurement sensor 52. The vibration state to be acquired is the same as or similar to the vibration state acquired in the simulation in the first embodiment.

The computer 30 acquires the above-described trajectory and vibration state from the robot controller 20 and displays the trajectory and the vibration state on the display device 36 or the display unit 32, as in the first embodiment. The computer 30 may also directly receive a detection result from the vibration measurement sensor 52. Because the detection result indicates the vibration state of the distal end section of the robot R, the computer 30 can display the vibration state in the same way as described above.

In the third embodiment, the computer 30 acquires the vibration of the distal end section of the robot R on the basis of actual measurements of the vibration of the distal end section of the actual robot R. Thus, the user can know exactly the vibration of the actual robot R. Furthermore, the user can appropriately perform the above-described learning for reducing the vibration of the actual robot R.

Although even slight vibration exerts a big influence on the processing accuracy of a workpiece, for example, when the distal end section of the robot R has reached a processing point or during processing, small vibration may not be problematic while the distal end section of the robot R is just moving. Such a determination differs depending on the type of workpiece, the type of processing to be applied to the workpiece, requirements for the processing accuracy, etc. In the above-described embodiments, the vibration state of the distal end section of the robot R is displayed, on the display device 36 or the display unit 32, together with the trajectory of the distal end section of the robot R. This configuration is extremely useful for the user to create and improve the operation program 33b, while satisfying the various above-described conditions.

Note that the computer 30 may acquire a vibration state of a base-end-side section of the robot R, the base-end-side section being closer to the base end than the distal end section of the robot R, and display the acquired vibration state on the display device 36 or the display unit 32. For example, vibration of the arm member 16, the arm member 15, or the like can be acquired in the simulation. This vibration can also be acquired on the basis of the operation information on each of the servomotors 11a, 12a, 13a, 14a, 15a, and 16a. It is also possible to acquire the vibration of the arm member 16, the arm member 15, or the like of the robot R by means of the vibration measurement sensor 52, such as an acceleration sensor or a laser tracker.

By displaying the vibration state of the base-end-side section on the display device 36 or the display unit 32 in this way, it may become easy to identify the cause of the vibration of the distal end section. Furthermore, it is also possible to display the difference between the vibration of the distal end section and the vibration of the base-end-side section, on the display device 36 or the display unit 32. This configuration is also advantageous for making it easy to identify the cause of the vibration of the distal end section.

Each of the above-described embodiments shows a VR system. In another example, it is also possible to adopt an AR system and to display, on the display device 36 or the display unit 32, the figures of the trajectory L and the vibration state, so as to overlap the figures on a real image of the robot R.

Figure 10:
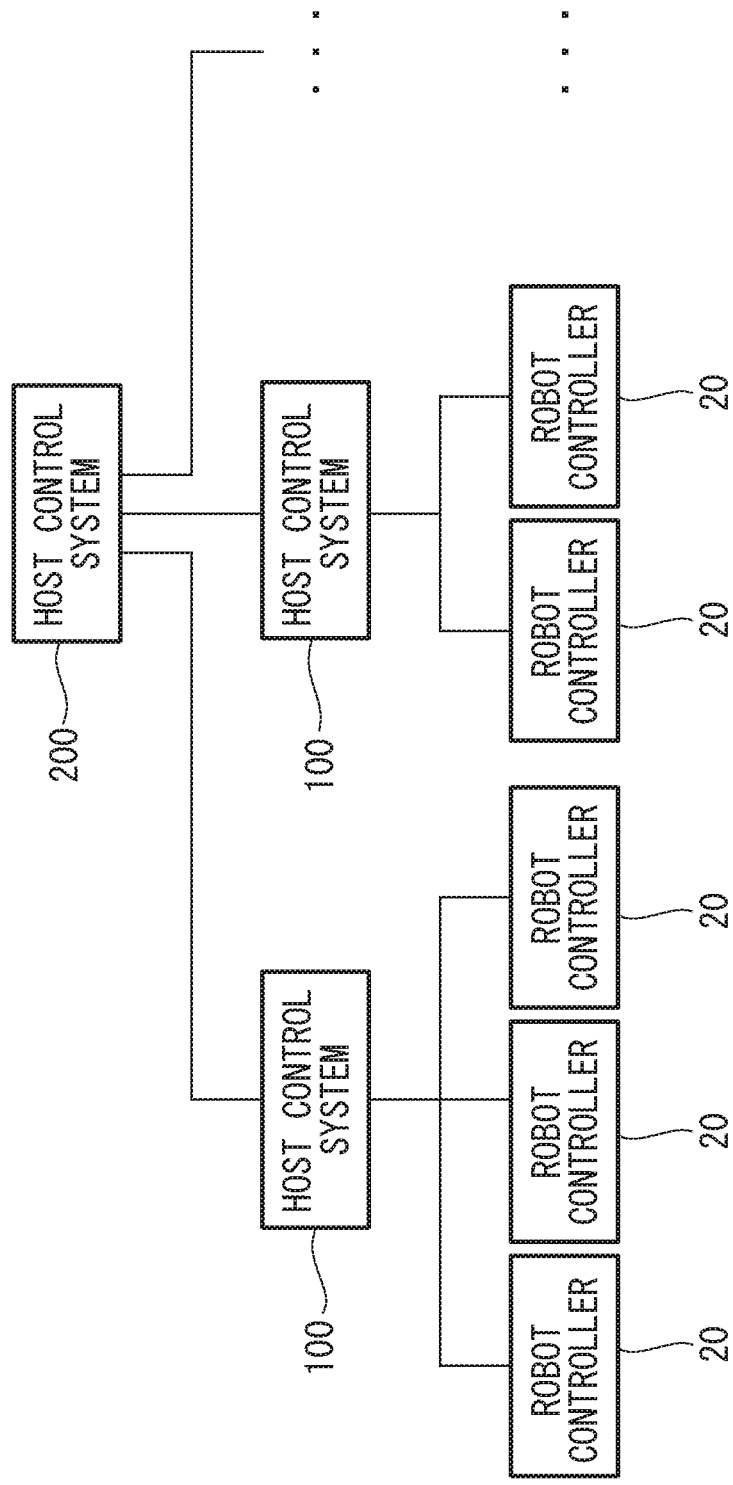
FIG. 10 is a block diagram of a management system having the robot controller in the respective embodiments.

As shown in FIG. 10, a plurality of computers 30 may be connected to a host control system 100. Because the robot controller 20 also functions as the operation program creating device like the computer 30, it is also possible to replace the computer 30 with the robot controller 20, in the following description.

The host control system 100 is, for example, a computer that is connected to the plurality of computers 30 by wires, a computer that is disposed in the same site as the plurality of computers 30, or the like. The host control system 100 is also called a fog computer. The host control system 100 can be a production management system, a shipment management system, a robot management system, a department management system, etc.

It is also possible that a plurality of host control systems 100 are connected to another host control system 200 etc. The host control system 200 is, for example, a cloud server connected to the plurality of host control systems 100 by wire or wireless. The plurality of computers 30 and the host control systems 100 and 200 form, for example, a management system.

The host control system 100 and the host control system 200 each include: a control unit that has a processor etc.; a display device; a storage unit that has a non-volatile storage, a ROM, a RAM, etc.; and an input device that is a keyboard, a touch panel, an operation panel, or the like.

Figure 11:
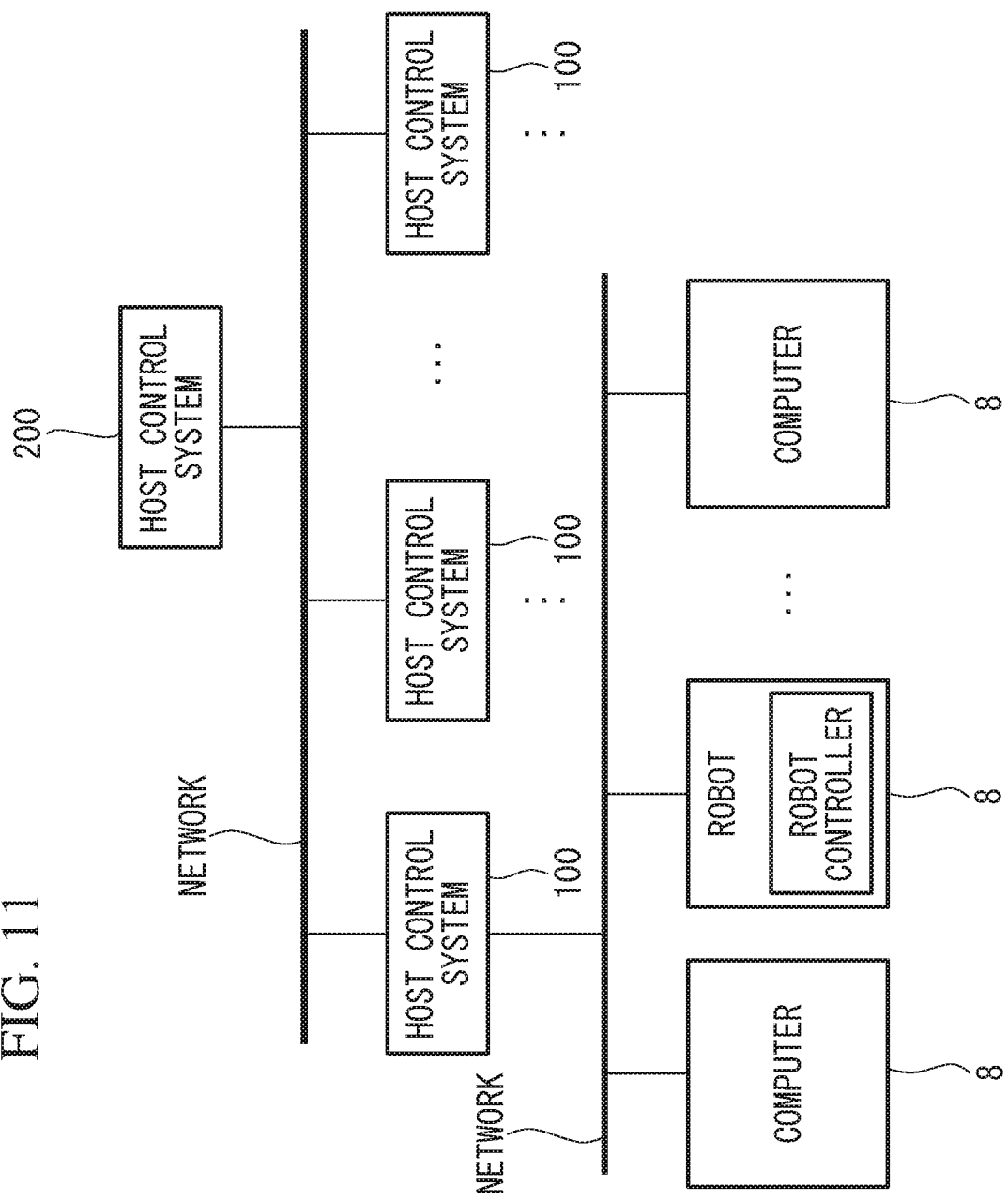
FIG. 11 is a block diagram of a system having the robot controller and the computer in the respective embodiments.

As shown in FIG. 11, such a system may include, for example, a plurality of edge computers 8, a plurality of host control systems 100, and one or a plurality of host control systems 200. In the system shown in FIG. 11, the computers 30, the robot controllers 20, and the robots R can be the edge computers 8. Some of the computers 30, the robot controllers 20, and the robots R may be the host control systems 100. The system shown in FIG. 11 includes a wired or wireless network.

Figure 12:
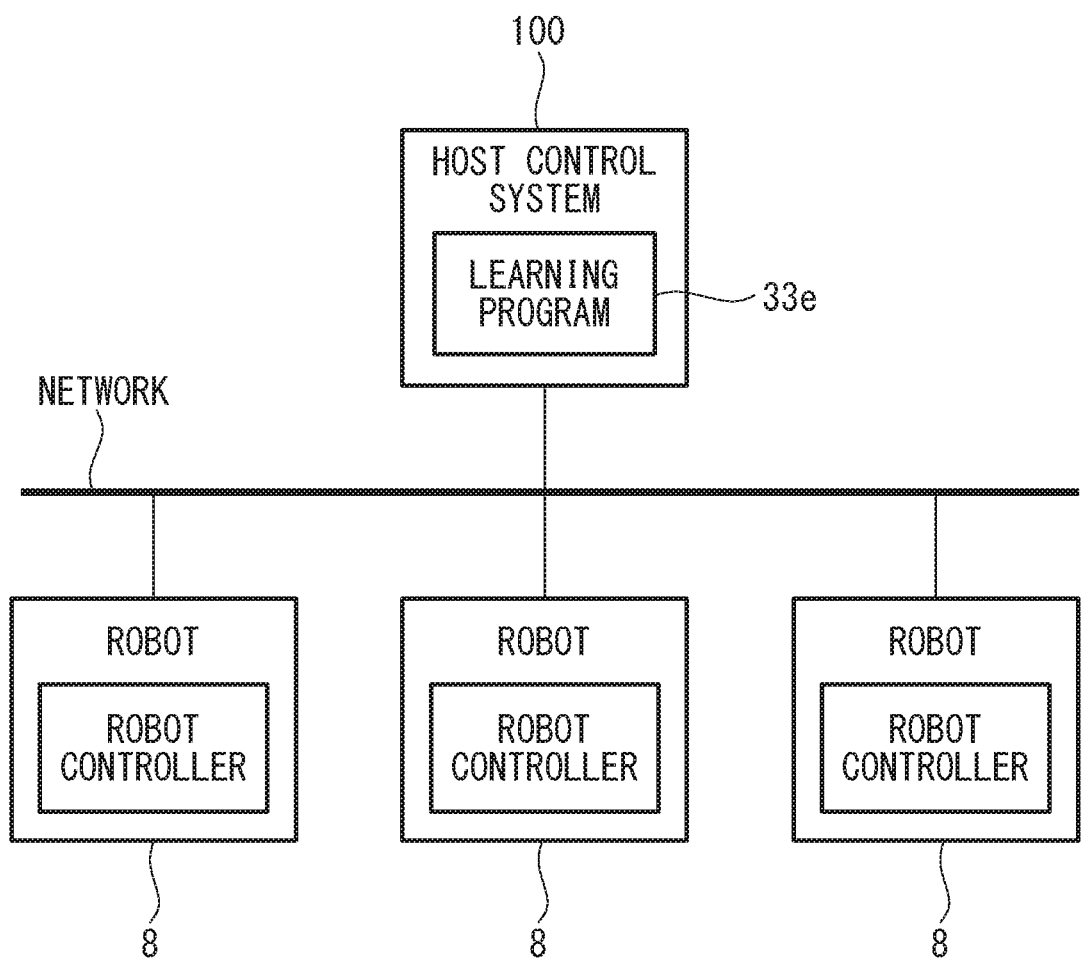
FIG. 12 is a block diagram of a system having the robot controller in the respective embodiments.

It is also possible that the plurality of edge computers 8 send the information for learning to another edge computer 8, another host control system 100, or another host control system 200 that has the learning function. For example, such transmission is performed in a configuration shown in FIG. 12. In this case, the other edge computer 8, the other host control system 100, or the other host control system 200, which has the learning function, performs learning by using the received information for learning, thereby making it possible to automatically and accurately obtain an operation parameter (learning result), an operation program (learning result), or the like that is used by the respective edge computers 8 to control the robots R.

Furthermore, the other edge computer 8, the other host control system 100, or the other host control system 200, which has the learning function, can obtain, by using the received information for learning, an operation parameter (learning result), an operation program (learning result), or the like that is common for the plurality of robots R, which are respectively controlled by the plurality of edge computers 8. Specifically, the plurality of robots R have the common operation parameter or operation program. According to this system, it is possible to improve the speed, the reliability, etc. of the learning by using various data sets.

Figure 13:
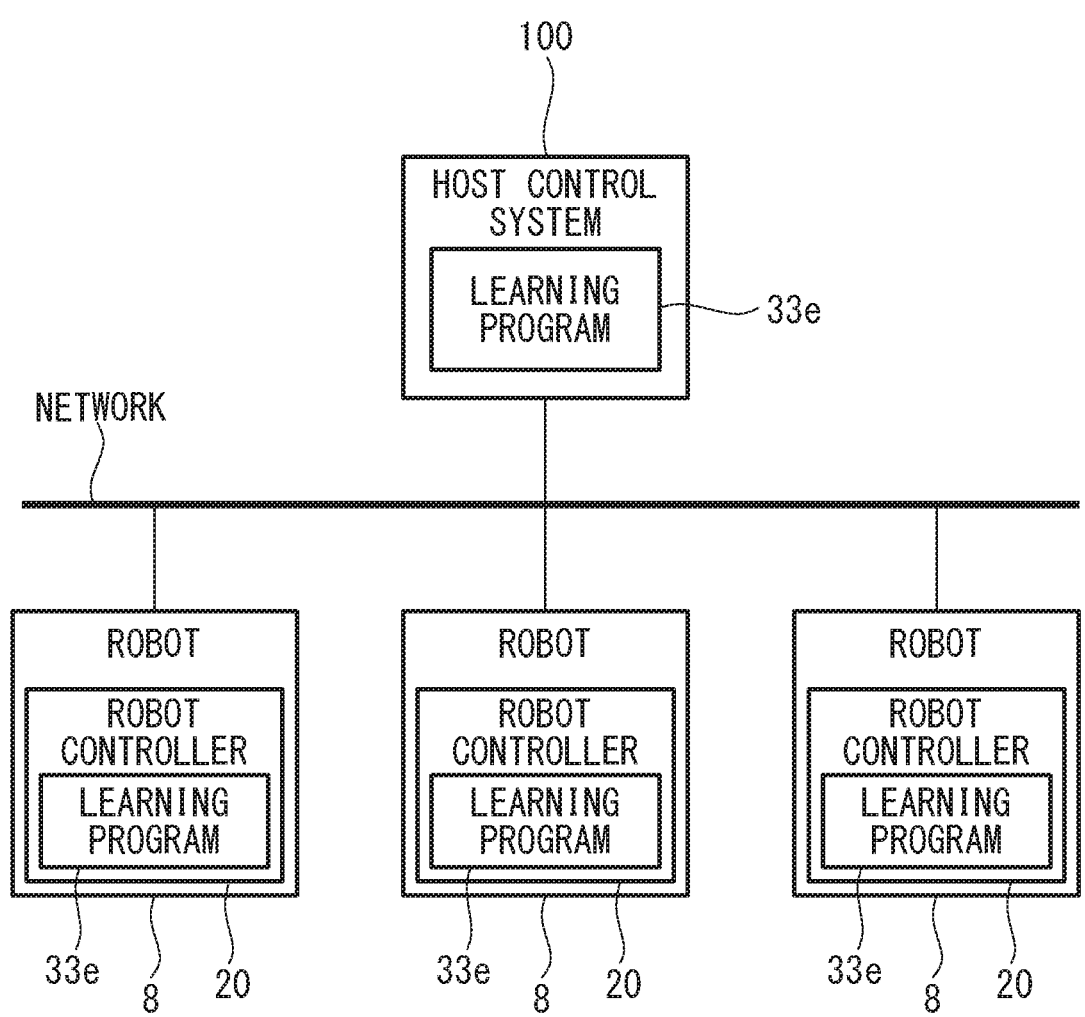
FIG. 13 is a block diagram of a system having the robot controller in the respective embodiments.

Furthermore, a plurality of edge computers 8 and a plurality of host control systems 100 that have the learning function may send at least one of the information for learning, a learning model that is created through learning, and a learning result to another edge computer 8, another host control system 100, or another host control system 200 that has the learning function. For example, such transmission is performed in a configuration shown in FIG. 13. The other edge computer 8, the other host control system 100, or the other host control system 200, which has the learning function, performs processing for optimizing knowledge and increasing efficiency on the basis of the received information, thereby creating a new optimized or efficient learning model or learning result. The created learning model or learning result is distributed to the edge computers 8, which control the robots R. In a case in which the learning result is distributed, it is not necessary for the edge computers 8, which serve as distribution destinations, to have a learning function.

The information for learning, the learning model, and the learning result can be shared among the edge computers 8. For example, such sharing is performed in the configuration shown in FIG. 13. This leads to an increase in the efficiency of machine learning. Furthermore, it is also possible to implement the learning function in some of the plurality of edge computers 8, which are connected to each other by the network, and to use learning results from these edge computers 8, when the other edge computers 8 control the robots. This leads to a reduction in the cost required for the machine learning.

An example case according to the above-described embodiments will be described below.

For example, as described above, the computer 30 or the robot controller 20 performs learning for reducing vibration in the selected range L1, which is selected from the trajectory of the distal end section of the robot R. Furthermore, the host control systems 100 and 200 receive, from the computer 30 or the robot controller 20, learning results and the operation program 33b, which is related to the learning, and accumulate the received learning results in association with the operation program 33b.

The host control systems 100 and 200 perform learning by using the accumulated learning results, and send the results of the learning to the computer 30 or the robot controller 20.

Furthermore, the host control systems 100 and 200 send the received learning results or the results of learning performed in the host control systems 100 and 200 by using the received learning results, to the computer 30 or the robot controller 20 that does not have the learning function.

The invention claimed is:

1. A vibration display device comprising:
a controller comprising a processor; and
a display,
wherein the processor is configured to conduct:
a vibration acquisition process that acquires a vibration state of a distal end section of a robot that is a robot in a simulation or in a real world, the distal end section being operated based on an operation program; and
a vibration trajectory drawing process that draws, on the display, the vibration state along a trajectory of the distal end section of the robot or that draws, on the display, the vibration state as the trajectory,
wherein the robot has an arm comprising a plurality of arm members which are connected in series,
wherein the processor acquires, in the vibration acquisition process, a base-end-side vibration state of one of the plurality of arm members, the one of the plurality of arm members being located at a proximal end side in the arm relative to the most-distal-end-side arm member of the plurality of arm members, and
wherein, in the vibration trajectory drawing process, the processor displays, on the display, the base-end-side vibration state along a trajectory of the one of the plurality of arm members or displays, on the display, the base-end-side vibration state as the trajectory of the one of the plurality of arm members.

2. The vibration display device according to claim 1, wherein:
the processor acquires, in the vibration acquisition process, the vibration state of the distal end section operated in accordance with the operation program and also acquires an improved vibration state of the distal end section operated in accordance with an improved operation program obtained by improving the operation program using a learning function; and
the processor displays: the vibration state or a taught trajectory; and the improved vibration state, on the display, along the trajectory of the distal end section of the robot.

3. The vibration display device according to claim 1, wherein:
the processor acquires, in the vibration acquisition process, the vibration state of the distal end section operated in accordance with the operation program and also acquires an improved vibration state of the distal end section operated in accordance with an improved operation program obtained by improving the operation program; and
the processor displays: the vibration state or a taught trajectory; and the improved vibration state, on the display, along the trajectory of the distal end section of the robot.

4. The vibration display device according to claim 1, wherein the display is a head-mounted display.

5. The vibration display device according to claim 1, wherein the processor enlarges and displays, on the display, an arbitrary region in a displayed image of the display, in response to an operation for enlarging and displaying the arbitrary region.

6. The vibration display device according to claim 1, wherein the processor acquires, in the vibration acquisition process, the vibration state based on: the vibration state of the distal end section of the robot in the simulation; operation information regarding each of a plurality of drive motors of the robot in the real world; or measuring results of vibration of the distal end section of the robot in the real world by means of a vibration measurement sensor.

7. An operation program creating device, comprising:
a controller comprising a processor; and
a display,
the processor is configured to conduct:
a vibration acquisition process that acquires a vibration state of a distal end section of a robot that is a robot in a simulation or in a real world, the distal end section being operated based on an operation program;
a vibration trajectory drawing process that draws, on the display, the vibration state along a trajectory of the distal end section of the robot or that draws, on the display, the vibration state as the trajectory; and
a learning process that performs learning about vibration of the distal end section and about a part and not all of the trajectory, wherein the trajectory is displayed on the display and the part is one which is arbitrarily selected by a user,
wherein the processor creates an improved operation program for reducing the vibration of the distal end section in the part of the trajectory.

8. The operation program creating device according to claim 7, wherein the processor automatically selects, in the trajectory of the distal end section, a region where vibration is large and performs the learning about vibration of the distal end section only in the selected region, which is automatically selected.

9. The operation program creating device according to claim 7, wherein the operation program creating device is configured to output information about the operation program and information on the selected region, to another operation program creating device or a host control system, or is configured to receive information about the operation program and information on the selected region, from another operation program creating device or a host control system.

10. A system comprising:
a robot;
an operation program creating device that creates an operation program for controlling the robot; and
a host control system capable of communicating with the operation program creating device,
wherein the operation program creating device comprises:
a display that displays a trajectory of a distal end section of the robot, the distal end section being moved in accordance with the operation program; and
a controller comprising a processor,
wherein the processor is configured to conduct
a learning process that performs learning about vibration of the distal end section in a selected region selected in the trajectory of the distal end section, which is displayed on the display, and that reduces vibration of the distal end section in the selected region, wherein the host control system accumulates learning results received from the operation program creating device.

11. The system according to claim 10, wherein the host control system is configured to send results of learning that is performed in the host control system by using the learning results, to the operation program creating device.

12. The system according to claim 10, wherein the host control system is configured to send the learning results or the results of learning that is performed in the host control system by using the learning results, to an operation program creating device that does not have a learning function.

* * * * *